United States Patent [19]
Dornieden et al.

[11] Patent Number: 6,122,821
[45] Date of Patent: Sep. 26, 2000

[54] ASSEMBLY APPARATUS WITH TOOTHED-BELT CONVEYOR

[75] Inventors: Georg Dornieden, Burgwalde; Steffen Strietzel, Heiligenstadt, both of Germany

[73] Assignee: Sim Automation GmbH & Co. KG, Heiligenstadt, Germany

[21] Appl. No.: 09/264,643

[22] Filed: Mar. 8, 1999

[30] Foreign Application Priority Data

Mar. 10, 1998 [DE] Germany ............... 198 10 224

[51] Int. Cl.[7] ............... B23P 23/02; B65G 21/22; B65G 47/00
[52] U.S. Cl. ............... 29/791; 29/430; 29/783; 29/784; 198/345.3; 198/463.4; 198/867.14
[58] Field of Search ............... 29/430, 742, 783, 29/784, 791, 799; 198/345.3, 465.1, 463.4, 867.14

[56] References Cited

U.S. PATENT DOCUMENTS

| | | | |
|---|---|---|---|
| 3,585,782 | 6/1971 | Staley | 53/159 |
| 3,811,548 | 5/1974 | Neff | 198/19 |
| 4,013,864 | 3/1977 | Tiegel et al. | 29/430 X |
| 5,419,425 | 5/1995 | Goater | 198/463.4 |
| 5,529,168 | 6/1996 | Soriano et al. | 198/465.1 |
| 5,676,235 | 10/1997 | Sam et al. | 198/345.3 |
| 5,979,637 | 11/1999 | Iwamoto et al. | 198/465.1 |

FOREIGN PATENT DOCUMENTS

| | | |
|---|---|---|
| 41 12 446 | 11/1991 | Germany . |
| 43 20 501 | 12/1994 | Germany . |
| 43 28 983 | 3/1995 | Germany . |
| 196 03 253 | 6/1997 | Germany . |

*Primary Examiner*—David P. Bryant
*Assistant Examiner*—Eric Compton
*Attorney, Agent, or Firm*—Herbert Dubno; Andrew Wilford

[57] ABSTRACT

An assembly apparatus has a plurality of stationary work stations spaced apart in a transport direction extending downstream from a holding station, a plurality of holders each adapted to carry a respective workpiece and each formed with at least one downwardly directed entrainment tooth, an upstream conveyor for feeding the holders in a row to the holding station, and a downstream conveyor extending downstream from the holding station past the work stations and including a belt formed with external teeth meshable with the teeth of the holders. A blocking element at the holding station can move between a position preventing downstream movement of the holders past the holding station and a position permitting such downstream movement. An intermediate conveyor at the holding station has another belt formed with external teeth and displaceable between a lower position with its belt out of engagement with the workpieces at the holding station and an upper position with its teeth engaging the tooth of the farthest downstream holder in the station. The belts can be advanced for conveying downstream and through the stations any holder whose tooth is engaged with the belt teeth. A rotary output cam and a push-pull actuator operated thereby and connected to the tools, to the intermediate conveyor, and to the blocking element simultaneously move the blocking element into the freeing position and raising the intermediate conveyor into the upper position to pick the farthest downstream holder off the row and advance it onto the downstream conveyor.

11 Claims, 5 Drawing Sheets

6,122,821

ASSEMBLY APPARATUS WITH TOOTHED-BELT CONVEYOR

FIELD OF THE INVENTION

The present invention relates to an assembly apparatus. More particularly this invention concerns an apparatus that performs a series of operations on a workpiece as it is moved through a series of work stations.

BACKGROUND OF THE INVENTION

A standard assembly machine, for instance serving to put together small- to medium-sized articles such as hinges or lamp sockets, sits adjacent a conveyor or transfer machine that brings to it a succession of partially constructed and/or assembled workpieces that the assembly machine must perform some operation on. Normally the assembly machine is provided with one or more grippers and/or with a tool that performs some desired operation on the workpiece, often adding to the workpiece a part that is fed in by another conveyor.

In a standard system described in German patent 4,320,501 of G. Dornieden each workpiece is carried on a respective holder that is moved along by a special-duty conveyor through a plurality of work stations to some of which are delivered parts that are added to the workpiece. Immediately downstream of the farthest downstream work station is an emptying station that either strips each workpiece off its holder so that the holder can be recirculated to a point upstream of the farthest upstream work station and fitted with a new unfinished workpiece or that actually moves each holder and its workpiece along to another machine or set of machines. The conveyor is a worm extending the full length of the production line from the farthest upstream station to the farthest downstream station and formed with a continuous screwthread having pitched sections extending helically of the worm's axis alternating with unpitched sections lying in respective planes perpendicular to this axis. Each holder has formations complementarily engaged with this screwthread so that as the worm rotates the holders are advanced in steps, moving axially downstream when their formations engage the pitched screwthread sections and stationary while engaging the unpitched sections.

In commonly owned and copending application Ser. No. 09/022,143
    filed Feb. 11, 1998 an assembly machine is described having a frame defining at least one work station, a transfer mechanism for feeding a succession of workpieces one at a time through the station, and at least one tool at the station movable between an operative position engageable with the workpiece in the station and a retracted position out of engagement with the workpiece in the station. A push-pull actuator has an outer end connected to the tool and an inner end connected to a cam carried on an output of a drive mounted on the frame for displacing the tool between its positions synchronously with feeding of the workpieces through the station. A pneumatic spring mounted on the frame is braced against the tool and has a compartment pressurizable to urge the tool into the operative position. The back compartment is continuously pressurized with a gas under a generally constant pressure.

These systems, which both use the cam-type shaft-driven conveyor, have several disadvantages. One cannot pick one holder and workpiece out of the system, for instance because it is defective or to perform a test, without creating a gap that will cause the devices at the stations to malfunction or report a problem and shut down the system. Similarly one cannot just insert a workpiece and its holder into the row without disrupting production. Furthermore the cam-drive system is expensive and complex, and expanding the system to extend its conveyor through farther stations is very complex and often prohibitively expensive.

OBJECTS OF THE INVENTION

It is therefore an object of the present invention to provide an improved assembly machine.

Another object is the provision of such an improved assembly machine which overcomes the above-given disadvantages, that is which allows workpieces and holders to be taken out of and added to the production line without difficulty, and where the conveyor is simple and easy to extend or shorten.

SUMMARY OF THE INVENTION

An assembly apparatus has according to the invention a frame defining a plurality of stationary work stations spaced apart in a transport direction extending downstream from a holding station, a plurality of holders each adapted to carry a respective workpiece and each formed with at least one downwardly directed entrainment tooth, an upstream conveyor on the frame for feeding the holders in a row to the holding station, and a downstream conveyor extending downstream in the direction on the frame from the holding station past the work stations and including a belt formed with external teeth meshable with the teeth of the holders. A blocking element at the holding station can move on the frame between a blocking position preventing downstream movement of the holders past the holding station and a freeing position permitting such downstream movement. An intermediate conveyor at the holding station on the frame has another belt formed with external teeth meshable with the teeth of the holders and displaceable between a lower position with its belt out of engagement with the workpieces at the holding station and an upper position with its teeth engaging the tooth of the farthest downstream holder in the station. The belts can be advanced in the direction for conveying downstream and through the stations any holder whose tooth is engaged with the belt teeth while a respective tool at each of the stations is engageable with the workpieces as same pass through the stations. A first drive has a rotary output cam and a push-pull actuator operated thereby and connected to the tools for operating same periodically. A second drive is connected to the intermediate conveyor and to the blocking element for simultaneously moving the blocking element into the freeing position and raising the intermediate conveyor into the upper position to pick at least the farthest downstream holder off the row and advance it onto the downstream conveyor. The second drive may in fact be integrated with the first drive.

This is an extremely simple system which, while ensuring perfectly synchronous movement and exact positioning of the holders as they move through the work stations, allows holders to be added to or taken out of the queue upstream of the holding station. Conveyor belts are extremely simple to operate, control, and service and extending the conveyor downstream is a simple matter of adding on another section, with the belts of the new section simply interleaved with the belts of the existing section and spanned over the downstream wheel or roller of the existing section.

The drive is also connected to the means for advancing the belts for moving the belts downstream in steps synchronized with movement of the blocking element and intermediate conveyor. Normally the drive includes a motor-transmission unit that periodically rotates the came and also periodically advances the belts. This drive has a rotary output shaft connected to the cam.

The downstream conveyor according to the invention includes a pair of parallel guide rails closely fitting with sides of the holders as same move through the work stations.

Respective retaining elements at the work stations engage transversely of the direction with the holders for securing them in the stations. A link connected between the retaining elements and the push-pull actuator operates the retaining elements synchronously with the blocking element and intermediate conveyor.

The downstream conveyor includes a pair of such toothed belts spaced apart transversely of the direction and the upstream conveyor includes a single toothed belt engaged between the pair of belts of the downstream conveyor. A downstream end of the intermediate-conveyor belt and upstream ends of the downstream-conveyor belts are spanned over a common wheel for synchronous movement of the belts and perfect handing off of the holders from the intermediate conveyor to the downstream conveyor.

The intermediate conveyor includes a vertically displaceable shoe over which its belt rides. A short stroke of 10 mm to several centimeters is normally sufficient. In addition or alternately the intermediate-conveyor belt can be spanned over a vertically displaceable wheel.

A power actuator can be operated by the push-pull actuator and coupled to the intermediate conveyor. This power actuator can be pneumatic, that is include a source of compressed gas, or be a simple spring. In this case the push-pull actuator, which can be a simple bowden-cable system, merely trips a valve that operates the pneumatic actuator.

BRIEF DESCRIPTION OF THE DRAWING

The above and other objects, features, and advantages will become more readily apparent from the following description, reference being made to the accompanying drawing in which:

FIG. 2a is a larger-scale view of the detail indicated at IIa in FIG. 2;

SPECIFIC DESCRIPTION

Figure 1:
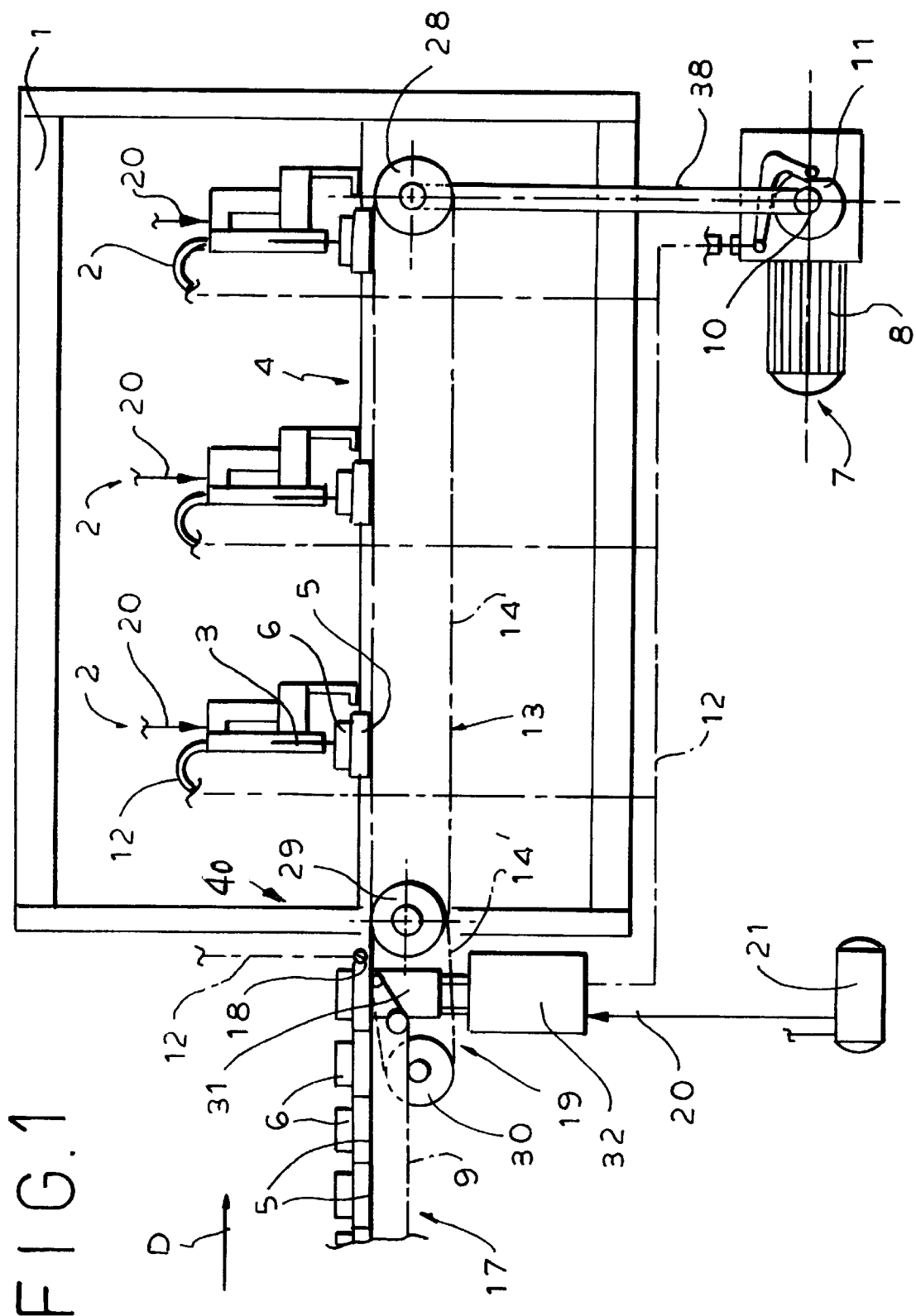
FIG. 1 is a partly diagrammatic side view of the apparatus according to the invention.
Figure 2:
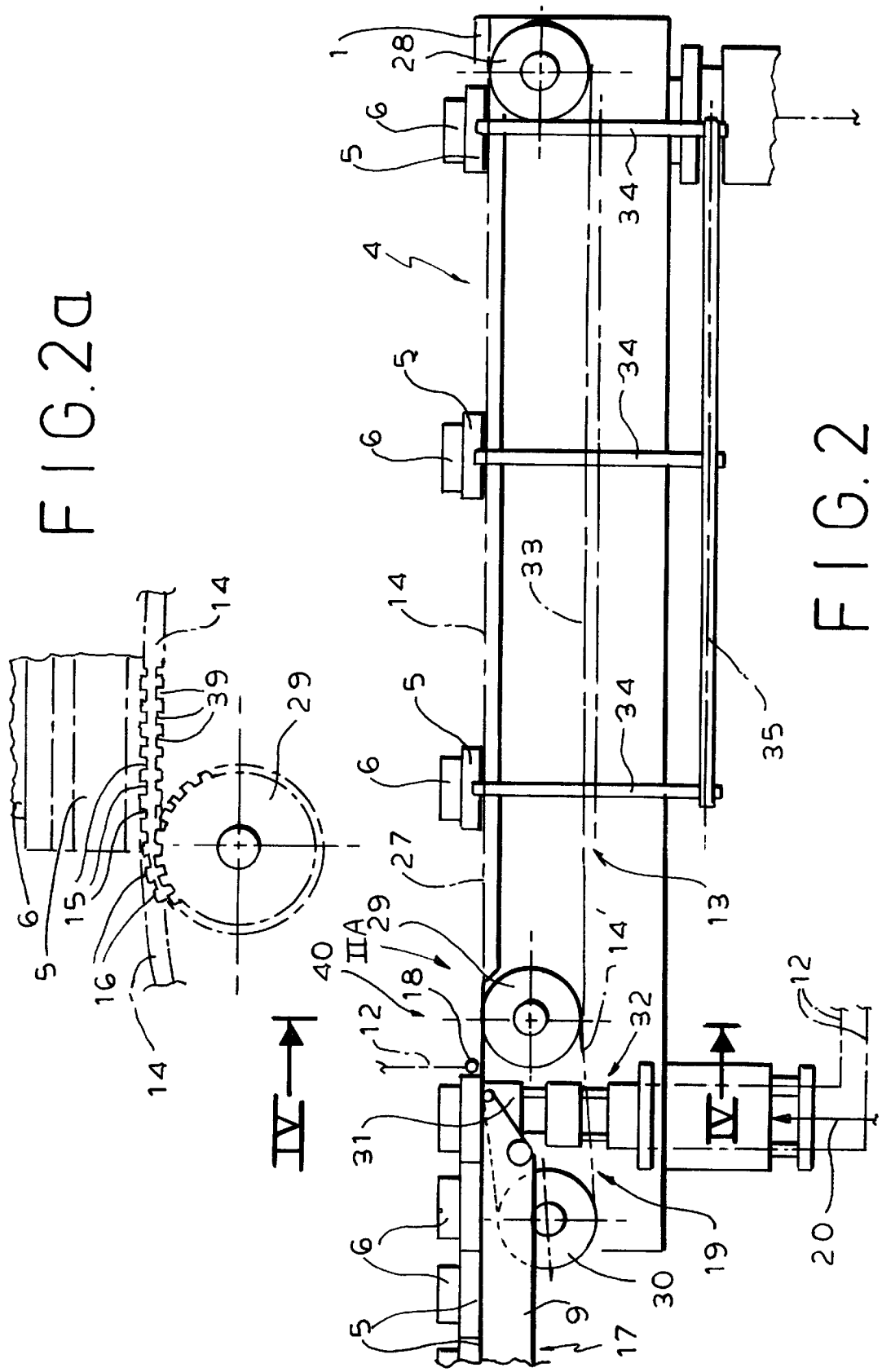
FIG. 2 is a larger-scale view of the conveyor of the apparatus.
Figure 3:
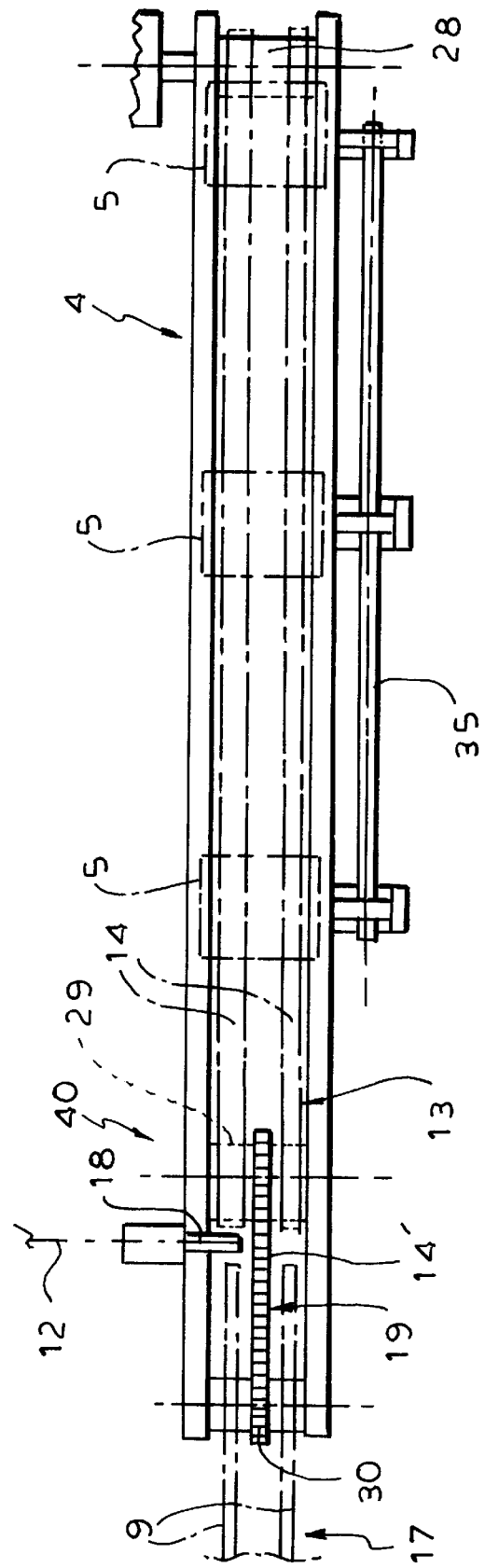
FIG. 3 is a top view of the structure of FIG. 2.

As seen in FIGS. 1, 2, and 3, the system of this invention has a stationary frame 1 provided with three working stations 2 spaced apart in a horizontal transport direction D and each having a tool 3 capable of working on a workpiece 6 held in a solid plastic holder 5 displaced in direction D in steps by a downstream portion 13 of a conveyor 4. A common drive 7 comprising a motor/transmission unit 8 having a rotary output shaft 10 carrying a cam 11 operates a push-pull actuator 12, e.g. a plurality of bowden cables, connected to the various tools 3 and to other elements of the apparatus as will be described below.

The downstream conveyor 13 comprises a pair of parallel belts 14 spanned over a downstream drive pulley 28 driven in steps via a belt 38 from the motor 8 and over an upstream drive pulley 29. These belts 14 each have external teeth 16 (FIG. 2a) that mesh with teeth 15 formed on the lower faces of the workpiece holders 5. Thus when the teeth 15 are meshed with the teeth 16, the holders 5 move in lockstep with the belts 14.

An upstream conveyor 17 has a pair of smooth support strands or belts 9 whose upper stretches move continuously in the direction D so that holders 5 supported thereon will be continuously urged downstream into a transfer or holding station 40. A blocking element 18 is provided at the downstream end of the conveyor 18 that is operated by the actuator 12 but that normally is in the FIG. 1 position in which it prevents the holders 5 from moving downstream off the upstream conveyor 17 onto the downstream conveyor 13.

An intermediate conveyor 19 is formed by a single belt 14' formed with external teeth like the belts 14 and spanned at its downstream end over the wheel 29 between the belts 14 and at its upstream end over another wheel 30 that is somewhat lower than the wheel 29. These belts 14 and 14' are also formed with internal teeth 39 and the wheel 29 is externally toothed so that these belts 14 and 14' move synchronously. The belt 14' passes over a shoe 31 carried on the upper end of an actuator 32 powered through a line 20 from a source 21 of compressed air and tripped by the actuator 12 so that periodically this shoe 31 will lift, at the same time as the element 18 is retracted out of the path of the holders 5, causing the external teeth on the belt 14' to mesh with the teeth 15 on the bottom of the farthest downstream holder 5 on the upstream conveyor 17, thereby moving it downstream onto the conveyor 14, although it is within the scope of the invention for it to pick off several of the farthest downstream holders 5. The roller or wheel 30 may also be lifted with the shoe 31. In addition the hydraulic line 20 may be connected to power actuators for the tools 3, so that the push-pull actuator 12 also serves here for tripping a valve that operates these tools 3.

Figure 4:
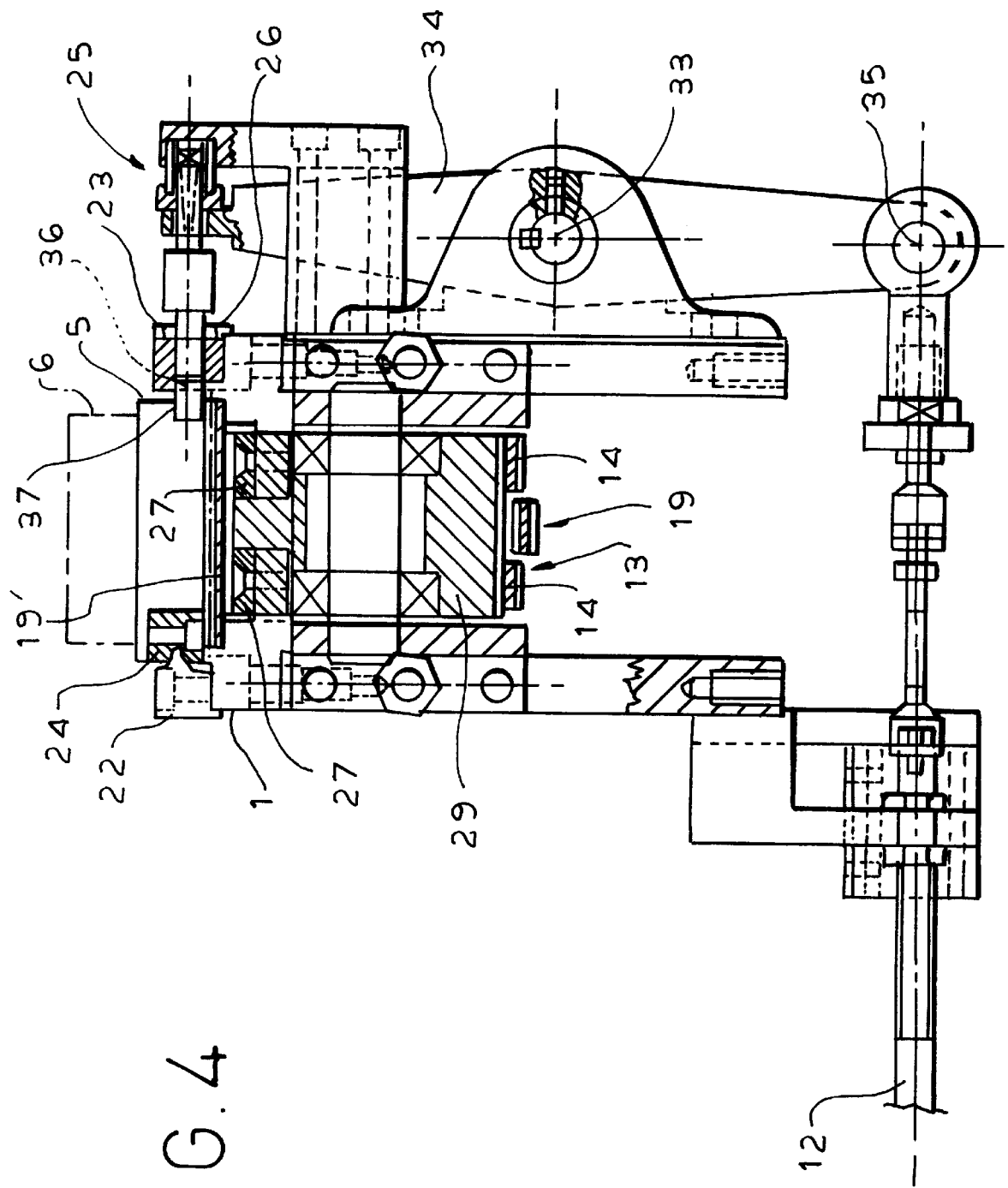
FIG. 4 is a section taken along line IV—IV of FIG. 2.
Figure 5B:
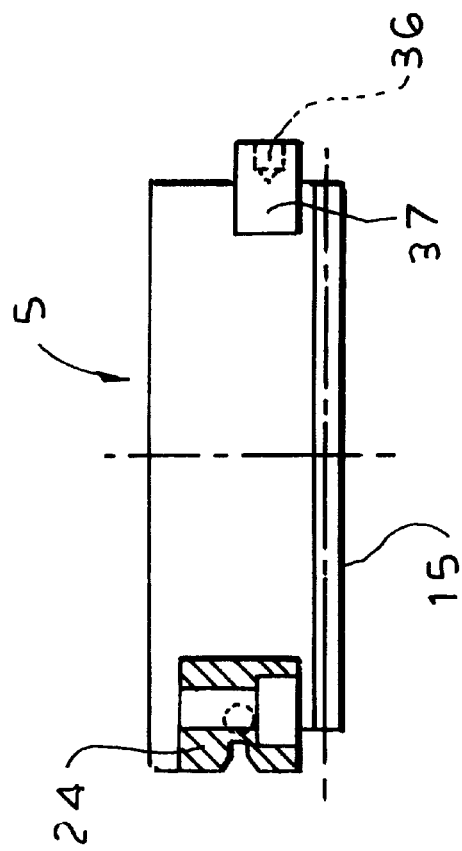
FIGS. 5a and 5b are side and partly sectional end views of the workpiece carrier in accordance with the invention.
Figure 5A:
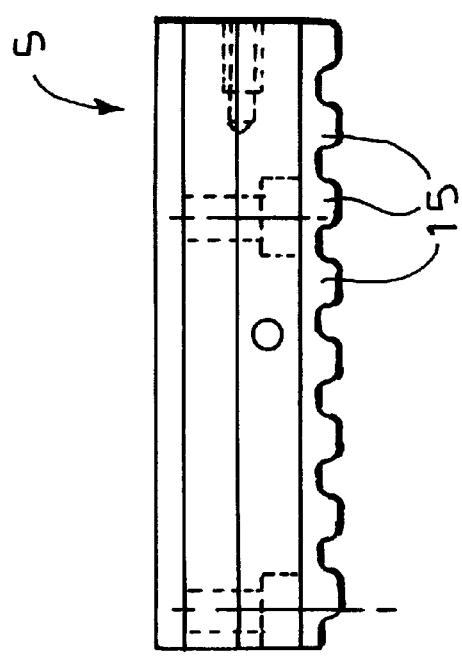

FIGS. 4, 5a, and 5b show how the holders 5 are guided on the conveyor 13 between a pair of rails 22 and 23. One side of each holder 5 is fitted with a metal guide rail 24 that is formed with a horizontal and outwardly open groove that fits complementary with a horizontally and inwardly projecting ridge of the rail 22 for exact positioning of the holders 5 horizontally transverse to the direction D. The other side of each holder 5 is provided with a metallic insert 37 having a seat 36 in which can fit the end of a retaining element or bolt 26 of a retaining mechanism 25. A lever 34 pivoted at 33 on the frame 1 at each station 2 has one end 35 connected to the push-pull actuator 12 and an opposite end linked to the bolt 26 to move it horizontally into and out of the seat 36 of the holder 5 in the respective station 2.

With this system the operations are all synchronized so that with each revolution of the drive cam 11 all the tools 3 are operated, the element 18 is retracted and foot 31 raised to feed a new holder 5 and workpiece 6 on the station conveyor 13, the conveyors 19 and 13 are all advanced sufficiently to move a holder 5 downstream to the next station 2, and the retainers 25 are operated to release one holder 5 and engage the next one. Upstream of the conveyor 13, the holders 5 are in a row abutting one another, and if one is removed the space will close up. A space can be formed by pushing a group of the holders 5 on the conveyor 17 upstream so that a holder 5 can be inserted in the row. Once on the conveyor 13, the holders 5 move in lockstep and will be moved, secured in place, and worked on synchronously.

We claim:

1. An assembly apparatus comprising:

a frame defining a plurality of stationary work stations spaced apart in a transport direction extending downstream from a holding station;

a plurality of holders each adapted to carry a respective workpiece and each formed with a laterally open seat and with at least one downwardly directed entrainment tooth;

an upstream conveyor on the frame for feeding the holders in a row to the holding station;

a downstream conveyor extending downstream in the direction on the frame from the holding station past the work stations and including a belt formed with external teeth meshable with the teeth of the holders and a pair of parallel guide rails closely fitting with sides of the holders as same move through the work stations;

a blocking element at the holding station displaceable on the frame between a blocking position preventing downstream movement of the holders past the holding station and a freeing position permitting such downstream movement;

an intermediate conveyor at the holding station on the frame having another belt formed with external teeth meshable with the teeth of the holders and displaceable between a lower position with its belt out of engagement with the workpieces at the holding station and an upper position with its teeth engaging the tooth of the farthest downstream holder in the station;

means for advancing the belts in the direction and for conveying downstream and through the stations any holder whose tooth is engaged with the belt teeth;

a respective tool at each of the stations engageable with the workpieces as same pass through the stations;

drive means having a rotary output cam and a push-pull actuator operated thereby and connected to the tools for periodically acting on the workpieces in the stations by the respective tools;

respective retaining elements at the work stations engageable transversely of the direction in the seats of the holders for securing the holders in the stations against movement in the direction;

drive means connected to the intermediate conveyor and to the blocking element for simultaneously moving the blocking element into the freeing position and raising the intermediate conveyor into the upper position to pick at least the farthest downstream holder off the row and advance it onto the downstream conveyor; and link means connected between the retaining elements and the push-pull actuator for operating the retaining elements synchronously with the blocking element and the intermediate conveyor.

2. The assembly apparatus defined in claim 1 wherein the drive means connected to the intermediate conveyor is operated by the push-pull actuator.

3. The assembly apparatus defined in claim 1 wherein the drive means connected to the blocking element is operated by the push-pull actuator.

4. The assembly apparatus defined in claim 1 wherein at least one of the drive means is also connected to the means for advancing the belts for moving the belts downstream in steps synchronized with movement of the blocking element and intermediate conveyor.

5. The assembly apparatus defined in claim 4 wherein the drive means having the push-pull actuator also has a rotary output shaft connected to the cam.

6. The assembly apparatus defined in claim 1 wherein the downstream conveyor includes a pair of such toothed belts spaced apart transversely and the upstream conveyor includes a single toothed belt engaged between the pair of belts of the downstream conveyor.

7. The assembly apparatus defined in claim 6, further comprising a common wheel over which a downstream end of the intermediate-conveyor belt and upstream ends of the downstream: conveyor belts are spanned.

8. The assembly apparatus defined in claim 1 wherein the intermediate conveyor includes a vertically displaceable shoe over which its belt rides.

9. The assembly apparatus defined in claim 1 wherein the intermediate-conveyor belt is spanned over a vertically displaceable wheel.

10. The assembly apparatus defined in claim 1 further comprising a power actuator operated by the pull-push actuator and coupled to the intermediate conveyor.

11. The assembly apparatus defined in claim 10 wherein the power actuator includes a source of compressed gas.

* * * * *